(12) United States Patent
Hassan et al.

(10) Patent No.: US 9,996,617 B2
(45) Date of Patent: Jun. 12, 2018

(54) METHODS AND SYSTEMS FOR SEARCHING LOGICAL PATTERNS

(71) Applicant: Tata Consultancy Services Limited, Mumbai (IN)

(72) Inventors: Ehtesham Hassan, Gurgaon (IN); Mohit Yadav, Gurgaon (IN); Puneet Agarwal, Gurgaon (IN); Gautam Shroff, Gurgaon (IN); Ashwin Srinivasan, Pilani (IN)

(73) Assignee: Tata Consultancy Services Limited, Mumbai (IN)

( * ) Notice: Subject to any disclaimer, the term of this patent is extended or adjusted under 35 U.S.C. 154(b) by 236 days.

(21) Appl. No.: 15/185,980

(22) Filed: Jun. 17, 2016

(65) Prior Publication Data
US 2016/0371376 A1 Dec. 22, 2016

(30) Foreign Application Priority Data
Jun. 19, 2015 (IN) .......................... 2351/MUM/2015

(51) Int. Cl.
| | |
|---|---|
| *G06F 17/30* | (2006.01) |
| *G06K 9/00* | (2006.01) |
| *G06K 9/62* | (2006.01) |
| *G06N 99/00* | (2010.01) |

(52) U.S. Cl.
CPC .... *G06F 17/30864* (2013.01); *G06F 17/3053* (2013.01); *G06F 17/30525* (2013.01); *G06F 17/30551* (2013.01); *G06F 17/30598* (2013.01); *G06K 9/00536* (2013.01); *G06K 9/00785* (2013.01); *G06K 9/6218* (2013.01); *G06N 99/005* (2013.01)

(58) Field of Classification Search
CPC ......... G06F 17/30864; G06F 17/30525; G06F 17/30551; G06F 17/30598
USPC ........................................................ 707/706
See application file for complete search history.

(56) References Cited

U.S. PATENT DOCUMENTS

| | | |
|---|---|---|
| 2008/0222109 A1 | 9/2008 | Sakurai |
| 2014/0149417 A1 | 5/2014 | Kim et al. |
| 2014/0172866 A1 | 6/2014 | Lin et al. |
| 2014/0379904 A1 | 12/2014 | Shimasaki et al. |

FOREIGN PATENT DOCUMENTS

WO  WO-2014/149027  9/2014

*Primary Examiner* — Joshua Bullock
(74) *Attorney, Agent, or Firm* — Finnegan, Henderson, Farabow, Garrett & Dunner LLP (57) ABSTRACT

Methods and systems for searching logical patterns in voluminous multi sensor data from the industrial internet is provided. The method retrieves instances of patterns in time-series data where patterns are specified logically, using a sequence of symbols. The logical symbols used are a subset of the qualitative abstractions specifically, the concepts of steady, increasing, decreasing. Patterns can include symbol-sequences for multiple sensors, approximate duration as well as slope values for each symbol. To facilitate efficient querying, each sensor time-series is pre-processed into a sequence of logical symbols. Each position in the resulting compressed sequence is registered across a TRIE-based index structure corresponding to the multiple logical patterns it may belong to. Logical multi-sensor patterns are efficiently retrieved and ranked using such a structure. This method of indexing and searching provides an efficient mechanism for exploratory analysis of voluminous multi-sensor data.

12 Claims, 5 Drawing Sheets

METHODS AND SYSTEMS FOR SEARCHING LOGICAL PATTERNS

PRIORITY CLAIM

This U.S. patent application claims priority under 35 U.S.C. § 119 to: India Application No. 2351/MUM/2015 filed on 19 Jun. 2015. The entire contents of the aforementioned application are incorporated herein by reference.

TECHNICAL FIELD

The embodiments herein generally relate to searching logical patterns, and, more particularly, to searching logical patterns that are voluminous and include diverse data available from the industrial internet.

BACKGROUND

Automation today is characterized by pervasive instrumentation with multiple sensors resulting in voluminous data on the behavior of machinery ranging from simple switches to complex systems including hundreds of thousands of parts. The volume and diversity of data from the myriad sensors deployed has the potential to help understand better the environments in which these machines are operating. It becomes imperative for engineers and technicians working with such data to look for specific events such as "hard stops", "lane-changes", "engine overload" and so on. Each pattern usually can be expressed in terms of the simultaneous occurrence of a set of logical patterns across multiple sensors. For instance, a hard-stop is a sudden drop in speed together with increasing brake pressure within a short span of time. Specific occurrences of such patterns may differ in their actual duration, as well as the exact nature of each drop or rise in a specified sequence. Thus, traditional techniques that rely on near-exact waveform matches miss many instances.

Events of interest are often characterized by a set of patterns in multiple sensors, occurring simultaneously. Further, the duration of every occurrence of an event is not constant. For instance, vehicle drivers don't always apply sudden breaks for a fixed duration every time. Also, the duration of the event is observed to be different in every sensor, involved in the event. For instance, when applying sudden break in a vehicle, the pattern in a break sensor is of longer duration than that in a speed sensor. The problem becomes even more complex because patterns need not occur in the same time-window for each sensors. For instance, there may be a small time gap between start of a 'sudden brake' pattern in speed sensor versus the brake sensor. Missing values in sensor readings further complicate matters making searching for multi-sensor patterns a challenge.

Often events of interest are based on domain knowledge. However it then requires significant manual effort to annotate events in voluminous sensor data. In practice, such events are detected programmatically by searching for hard-coded conditions being observed in the sensor values. For instance, an event might be translated into a hard-coded rule seeking situations where "sensor–1 is higher than s1 at time t1 and derivative of sensor–2 is more than d2 for duration t2". Because of the practical challenges, such hard-coded rules are often ineffective, as well as difficult to implement. Alternative techniques for the detection of time-series events use machine-learning techniques, but most of these methods work on time-series subsequences that have been extracted from the whole time-series already. However, these methods known in the art are plagued by challenges including but not limited to variable duration of events, mis-alignment in time of occurrences of patterns across sensors and variation in response to the same event. Also, methods known in the art find matches to a particular pattern rather than all instances that might correspond to an event of interest.

A lot of prior art has also focused on the supervised classification for identification of events in time-series. Some use a mix of supervised and un-supervised methods to discover temporal patterns from the dataset and can discriminate these temporal patterns from the rest. But all such methods require labelled instances of time-series segments in order to train their classifiers. Also, most of these approaches work on time-series segments of fixed length. However these methods also struggle in detecting practical events that are of variable length and span multiple sensors, since one would need to explore multiple lengths of windows spanning the entire time-series, making detection computationally intensive using such approaches.

There is a need therefore for methods and systems that address the above and other possible drawbacks and limitations of the currently used methods and systems relating to the field of searching logical patterns.

SUMMARY

Embodiments of the present disclosure present technological improvements as solutions to one or more of the above-mentioned technical problems recognized by the inventors in conventional systems.

Methods and systems are described that enable searching logical patterns from multi sensor time-series data. Searching and querying in large volume of multi sensor time series data, time-series data summarization, query formation for search in time series and time-series storage and indexing are some of the challenges addressed by the systems and methods of the present disclosure while ensuring efficiency and accuracy.

In an aspect, there is provided a method for searching and retrieving logical patterns from multi sensor time-series data that can include receiving at least one time-series data from at least one sensor for searching and retrieving logical patterns, by an input module; pre-processing the received at least one time-series data into at least one sequence of logical symbols, by a pre-processor; extracting logical patterns from the at least one sequence of logical symbols, by an extractor; clustering and storing the extracted logical patterns in a disk and a memory, by an organizer; and iteratively performing: describing a pattern to be retrieved from the stored clusters in a pre-defined search query, by a pattern generator; searching and retrieving at least one cluster from the disk referenced in TRIE based index structure in the memory, if found relevant to the search query, by a search engine; ranking the logical patterns retrieved in the at least one cluster found relevant to the search query based on degree of relevance to the search query, by a ranking engine; and retrieving at least one of a highest ranked logical patterns detected in response to the search query, by a pattern retriever.

In an embodiment, the step of pre-processing the received at least one time-series data can further include splitting of the received at least one time-series data into a plurality of non-overlapping time-series segments; computing slopes of each segment; sorting and grouping the sorted set of segments based on the computed slopes, each group having equal number of sample points; computing average slopes for each group of segments; annotating each sample point as increasing (+), steady (0) and decreasing (−) by comparing the slope with the corresponding computed average value of slope; and classifying the at least one time-series data as a sequence of logical symbols characterized by the annotated sample points, value comprising average magnitude and length of the segment.

In an embodiment, the step of pre-processing the received at least one time-series data can be preceded by the step of smoothing to eliminate noise, the step of smoothing being performed by at least one technique selected from the group consisting of moving average filter, additive smoothing, Butterworth filter, digital filter, Kalman filter, Laplacian smoothing, exponential smoothing, stretched grid method, low-pass filter, Savitzky-Golay smoothing filter, local regression, smoothing spline, Ramer-Douglas-Peucker algorithm, and Kolmogorov-Zurbenko filter.

In accordance with an embodiment, the step of pre-processing the received at least one time-series data can further include the step of refining the sequence of logical symbols by merging logical symbols having length of the segment lesser than a pre-defined threshold.

In accordance with an embodiment, the value and length of the segment can include at least one of three attributes such as free type, approximate type and range type.

In an embodiment, the step of clustering and storing the extracted logical patterns can further include: pre-defining a common threshold for all sensors by performing Z-normalization; rejecting the extracted logical patterns having magnitude deviation smaller than the pre-defined threshold; representing every extracted logical pattern of fixed length of logical symbols as a vector; clustering like vectors according to time-stamp, duration and values of associated logical symbols along with either the associated index or index of the next symbol in the logical pattern; storing the clusters on a disk as database summary; and storing metadata of the clusters in a memory in a TRIE-based structure.

In an embodiment, the step of describing a pattern to be retrieved from the stored clusters in a pre-defined search query can further include defining at least one attribute associated with the value and length of the segment for each logical symbol.

In an embodiment, the step of searching and retrieving at least one cluster can further include: initializing a cluster container list for each sensor involved in the search query, the cluster container list comprising a first dimension for storing indexes of runs and a second dimension for storing indexes of time-stamps where the logical pattern has appeared within that run; sorting clusters within the TRIE-based structure for each sensor based on their distance from the search query; loading nearest clusters into the cluster container list for each sensor; iteratively performing: identifying common time stamps which satisfy properties specified by the search query; computing heuristics value for all choices of clusters to load; loading the cluster with highest heuristic value; and terminating the search when a pre-defined termination criterion is met.

In accordance with an embodiment, the search query is a textual query.

In accordance with an embodiment, the step of identifying common time stamps can include finding an intersection of occurrences of logical patterns across the at least one sensor for common time stamps by: detecting intersection in the first dimension of the cluster container list; and detecting intersection in the second dimension of the cluster container list, in the event that there is a match for intersection in the first dimension.

In another aspect, there is provided a system for searching and retrieving logical patterns from multi sensor time-series data comprising: one or more processors; a communication interface device; one or more internal data storage devices operatively coupled to the one or more processors for storing: an input module configured to receive at least one time-series data from at least one sensor for searching and retrieving logical patterns; a pre-processor configured to pre-process the received at least one time-series data into at least one sequence of logical symbols; an extractor configured to extract logical patterns from the at least one sequence of logical symbols; an organizer configured to cluster and store the extracted logical patterns in a disk and a memory; a pattern generator configured to describe a pattern to be retrieved from the stored clusters in a pre-defined search query; a search engine configured to search and retrieve at least one cluster from the disk referenced in TRIE based index structure in the memory, if found relevant to the search query; a ranking engine configured to rank the logical patterns retrieved in the at least one cluster found relevant to the search query based on degree of relevance to the search query; and a pattern retriever configured to retrieve at least one of a highest ranked logical patterns detected in response to the search query.

In yet another aspect, there is provided a computer program product comprising a non-transitory computer readable medium having a computer readable program embodied therein, wherein the computer readable program, when executed on a computing device, causes the computing device to: receive at least one time-series data from at least one sensor for searching and retrieving logical patterns, by an input module; pre-process the received at least one time-series data into at least one sequence of logical symbols, by a pre-processor; extract logical patterns from the at least one sequence of logical symbols, by an extractor; cluster and store the extracted logical patterns in a disk and a memory, by an organizer; describe a pattern to be retrieved from the stored clusters in a pre-defined search query, by a pattern generator; search and retrieve at least one cluster from the disk referenced in TRIE based index structure in the memory, if found relevant to the search query, by a search engine; rank the logical patterns retrieved in the at least one cluster found relevant to the search query based on degree of relevance to the search query, by a ranking engine; and retrieve at least one of a highest ranked logical patterns detected in response to the search query, by a pattern retriever.

It is to be understood that both the foregoing general description and the following detailed description are exemplary and explanatory only and are not restrictive of the disclosure, as claimed.

BRIEF DESCRIPTION OF THE DRAWINGS

The embodiments herein will be better understood from the following detailed description with reference to the drawings, in which.

It should be appreciated by those skilled in the art that any block diagram herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computing device or processor, whether or not such computing device or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The expression industrial internet as referred to in the present disclosure pertains to the integration of physical machinery with networked sensors and software. Voluminous data captured from the large number of sensors generally associated with machines of all kinds including engines, factory equipment and the like are transmitted for further behavioral analysis of the associated machine under various conditions. Such data received from sensors either directly or indirectly coupled to the system in the form of time-series data serve as input to the system of the present disclosure.

The embodiments herein provide systems and methods for searching logical patterns from voluminous multi-sensor time-series data available from the industrial internet. Systems for searching logical patterns are faced with practical challenges particularly when patterns relate to variable durations of events, there is shift in the time of occurrences of patterns across different sensors and there is a variation in the response time of different sensors to the same actual event. Patterns characterize events and it is imperative to be able to effectively search for patterns and identify associated events to be able to use available voluminous data effectively. Systems and methods of the present disclosure particularly address these issues of the art by finding occurrences of a pattern given its description in logical terms instead of discovering temporal patterns that characterize the behavior of the underlying system.

For ease of explanation, the description of systems and methods of the present disclosure is provided with reference to non-limiting example of sessions of operation of an exemplary mechanical system, for instance run of a vehicle. It may be understood that systems and methods of the present disclosure can find applicability in any domain wherein exploratory data analysis, tagging candidate event occurrences for training a machine-learning system, by human analysis of the retrieved instances in response to a logical pattern query and selecting sub-sequences on which to apply a classifier is required.

Although systems and methods of the present disclosure are explained herein below with reference to two or more time-series data received by the system of the present disclosure, it may be understood by a person skilled in the art that the systems and methods of the present disclosure can find applicability even when only one time-series data is involved.

Figure 1:
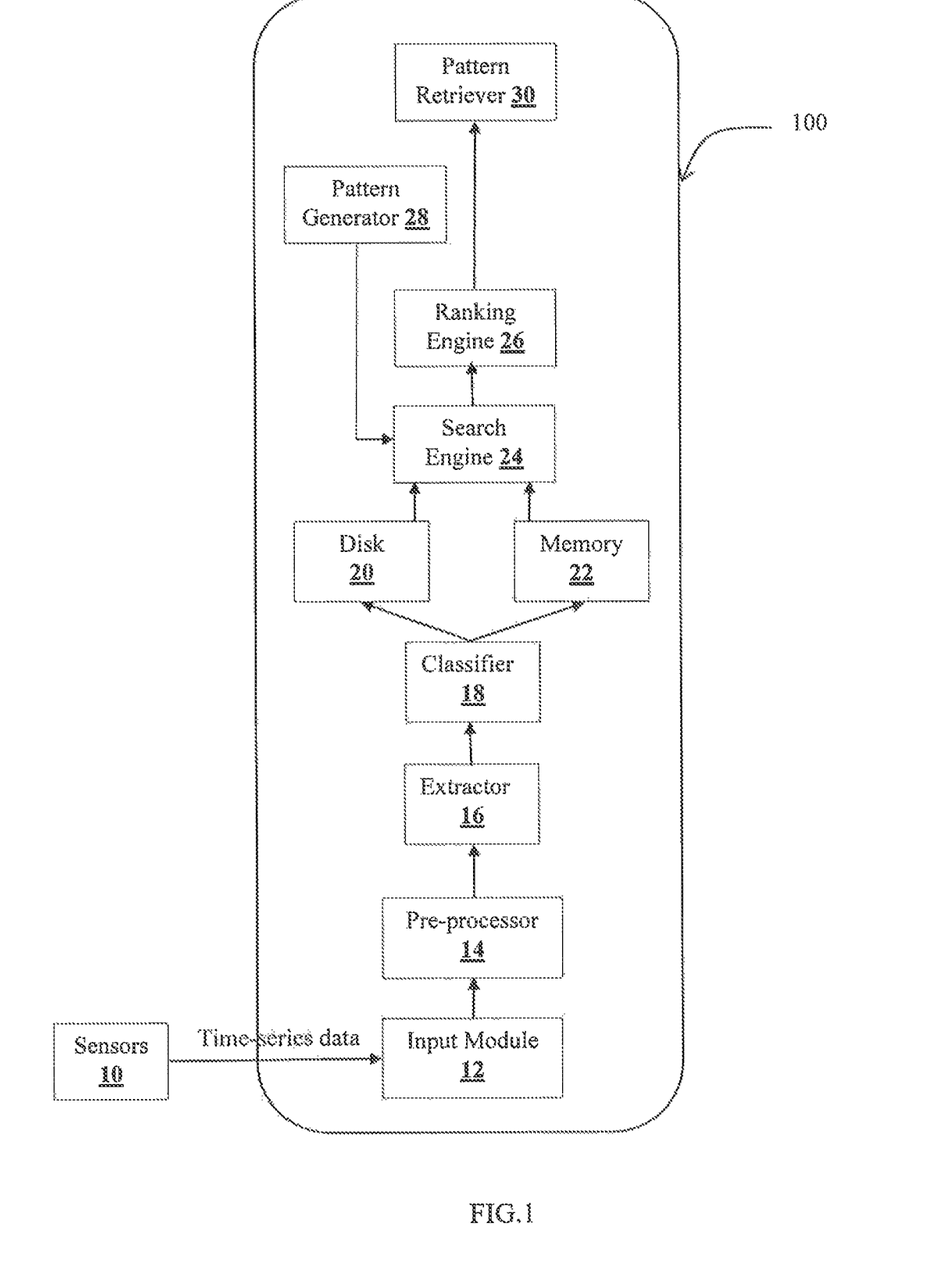
FIG. 1 illustrates an exemplary block diagram of a system for searching logical patterns from voluminous multi-sensor time-series data available from the industrial internet in accordance with an embodiment of the present disclosure.
Figure 3:
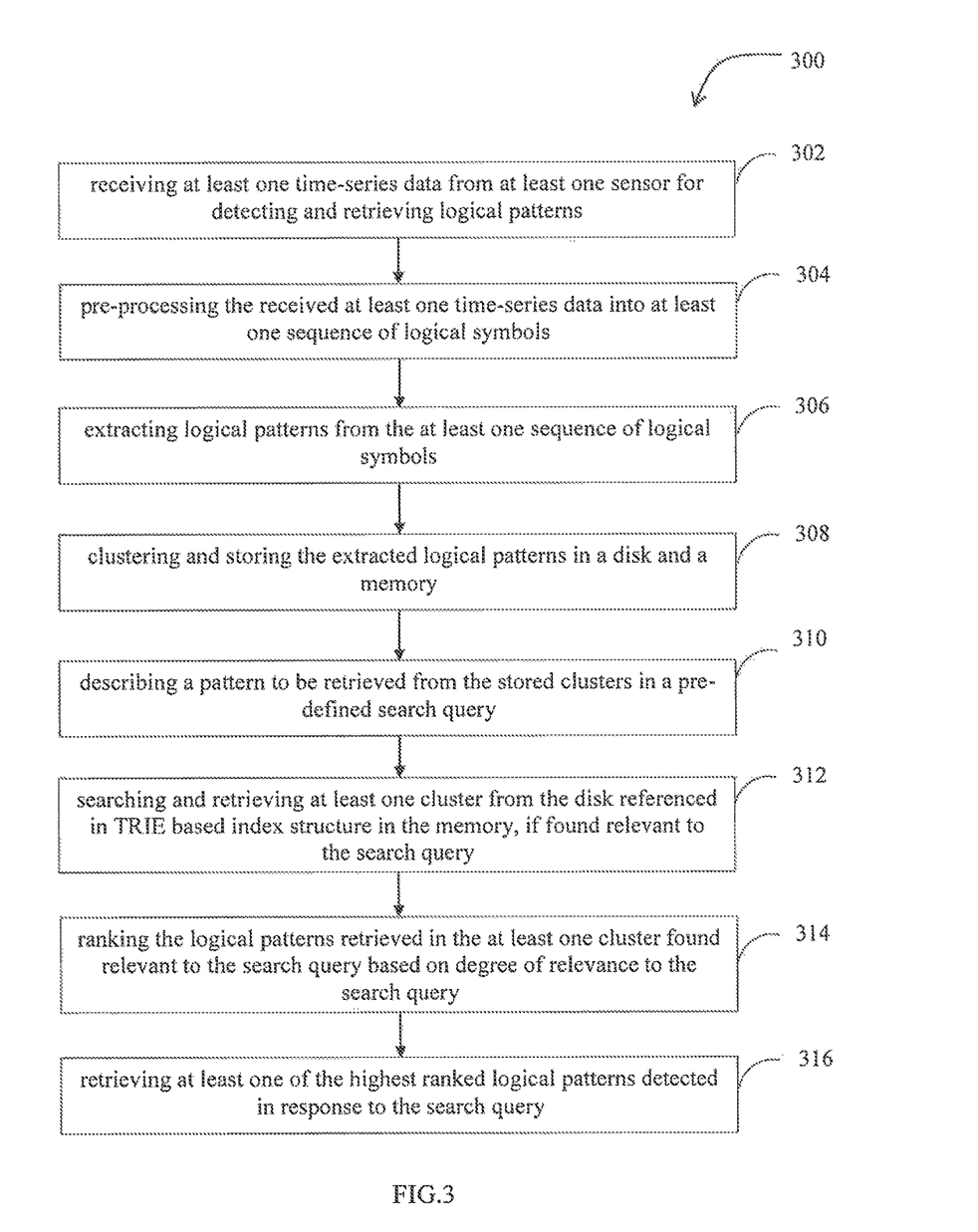
FIG. 3 is an exemplary flow diagram illustrating a method for searching logical patterns from voluminous multi-sensor time-series data using the system of FIG. 1 in accordance with an embodiment of the present disclosure.

Referring now to the drawings, FIG. 1 illustrates an exemplary block diagram of system 100 for searching logical patterns from voluminous multi-sensor time-series data available from sensors 10 integrated in the industrial internet in accordance with an embodiment of the present disclosure. FIG. 3 is an exemplary flow diagram illustrating a method 300 for searching logical patterns from voluminous multi-sensor time-series data using the system of FIG. 1 in accordance with an embodiment of the present disclosure. The steps of method 300 of the present disclosure will now be explained with reference to the components of system 100 as depicted in FIG. 1.

At step 302, time-series data from sensors 10 are received at input module 12 of system 100 for searching and retrieving logical patterns.

At step 304, the received time-series data is pre-processed into sequences of logical symbols, by pre-processor 14. Multi-sensor time-series data T is obtained from multiple sensors and recorded for many sessions of operation of the underlying mechanical system such as a run of a car, a day of operation of a plant, and the like. For the purpose of explanation, sessions of operations as runs of underlying vehicles are also referred to as segments of time-series T. Before processing raw data T, it is split into multiple segments ($T_1, T_2, \ldots, T_M$), which correspond to different runs of vehicles. Every time-series segment $T_i$ is then converted into a sequence of logical symbols $Z_i = \{Z_1^i, Z_2^i, \ldots, Z_N^i\}$.

At step 306, logical patterns are extracted from the sequences of logical symbols, by extractor 16. For every run Ti, slopes are computed which is the difference between adjacent sensor values. A sufficiently large number of samples of slopes are considered and sorted. This sorted list is then divided into three groups, keeping the number of points in each group as same, and then average slope for every group is computed. Based on the value of these average slopes these groups are represented by symbols '+', '0' and '−', representing increasing (+), steady (0), and decreasing (−) patterns in time-series. The slope of every point in the multi-variate time-series Ti is then compared with the corresponding average values of slopes of the three symbols, and based on which of these distances is the smallest that point of the time-series is encoded as '+', '0', or '−'. All continuous occurrences of a symbol are replaced by pair of terms including the symbol and its length. In this pair of terms, the average slope of various points that were removed to create this pair are also included. The triple (logical symbol Z, count of the symbol k and count of the segment i), is represented as $Z_k^i$, i.e., $k^{th}$ symbol from $i^{th}$ segment of time-series and it includes three terms: the symbol, its length and the average slope of points represented by $Z_k^i$. As a result, the time-series is represented by a sequence of logical symbols $Z_i = \{Z_1^i, Z_2^i, \ldots, Z_N^i\}$. In accordance with an embodiment, the logical sequence is further refined by merging triples that are of lesser duration than a threshold to weed out noise as indicated in Algorithm 1 herein below.

---

Algorithm 1: Merging criterion
--- white list $Z_i$ has not reached end do
    // For every symbol $Z_k^i$
    if length of $Z_k^i \geq$ threshold or $Z_k^i$ is first / last symbol then
        Shift to next symbol;
        continue;
    end
    If symbol of $Z_{k-1}^i$ is same as of $Z_{k+1}^i$ then
        Merge $Z_{k-1}^i$, $Z_k^i$ and $Z_{k+1}^i$;
        Update representation of merged symbols and shift to next symbol;
    else
        If $Z_k^i ==$ '0' then
            Merge $Z_k^i$ to previous / after, whichever has slope nearer to slope $Z_k^i$;
            Update representation of merged symbols and shift to next symbol;
        else
            Assign $Z_k^i \leftarrow$ '0' and merge with '0' only if average slop of $Z_k^i$ lies between center of symbol of $Z_k^i$ and center of '0';
            Update representation of merged symbols and shift to next symbol;
        end
    end
end

---

At step 308, the extracted logical patterns are clustered and stored in disk 20 and memory 22, by organizer 18. A logical pattern is a sequence of symbols '+', '0', or '−' without any pair of adjacent same symbols. All logical patterns of symbols of up to a fixed length (for instance 5 units) are extracted. After extracting logical patterns from sequences, patterns which have magnitude deviation smaller than a pre-defined threshold are rejected. The magnitude deviation of a logical pattern is measured as the difference between maximum and minimum values of the time-series corresponding to that pattern. Since different sensors have different range of values, each sensor would require a different threshold. In order to avoid multiple thresholds, Z-normalization is performed and a single threshold for all sensors is defined. After elimination of patterns having magnitude deviation smaller than a pre-defined threshold, all instances that belong to a valid logical pattern, for instance {−, 0, +} are compiled. Every pattern of fixed length of symbols is represented as a vector. The dimensions of the vectors include length (duration) of every symbol in the pattern, average slopes of '+' and '−' symbols, and average absolute value of the times-series corresponding to symbol '0'. Normalization is performed to get rid of bias that appears because of high variation in the range of different sensors. The vectors are then clustered using techniques known in the art including but not limited to Birch clustering. In accordance with an embodiment, if a pattern starts or ends with '0' symbol, its length is ignored during the step of clustering. This is based on the fact that vehicle remains stationary for longer interval of time after/before various events which may not be relevant in many practical scenarios. For instance, how long the vehicle was running before hard stop was applied may not be of relevance for an analysis.

A folder is maintained for every sensor and the folder can contain a file for every logical pattern of that sensor. All clusters of a pattern are stored in the same file. Various clusters are written in the file in a sequential manner. Each cluster description contains the vectors of the logical pattern, sorted according to time-stamp and have time-series segment marked. For every time-stamp, durations and values of every symbol present along with the index at which logical pattern starts in the time-series segment are stored. There is an exception for those logical patterns which start with '0', for them index of the next symbol present in logical pattern is stored.

Figure 2:
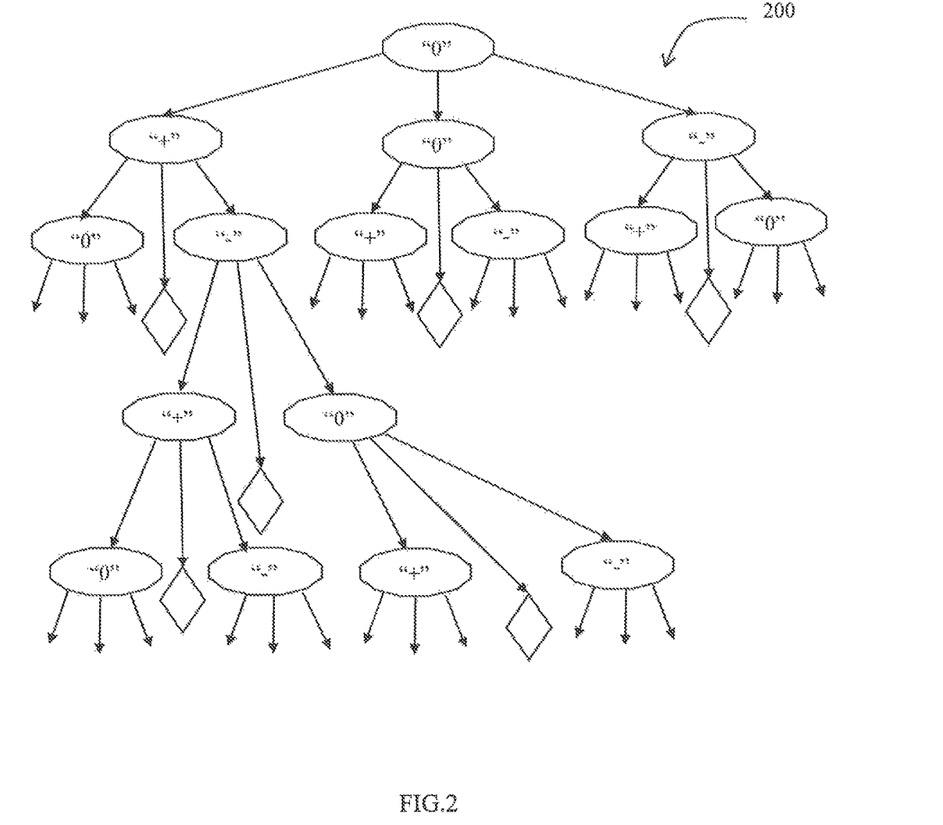
FIG. 2 illustrates a TRIE-based index structure implemented by the system of the present disclosure in accordance with an embodiment of the present disclosure.

Besides storing results obtained after clustering logical patterns, meta-data of these clusters which is required to be loaded before execution of any query on TRIE based structure (as illustrated in FIG. 2) are also computed and stored. FIG. 2 illustrates a TRIE-based index structure 200 implemented by the system of the present disclosure in accordance with an embodiment of the present disclosure. In TRIE-based structure, root node of the TRIE is assigned NULL, and it has three child nodes, one for each logical symbol that can occur at the start of a logical pattern. At every next level of the TRIE also every node has three child nodes, two of them are used for next symbols of a logical patter and the third node (in the middle, with diamond shape in FIG. 2) is used for storing information about the logical pattern that starts at root node and ends at current node. Diamond node at the end of every logical pattern contains three types of information: information about clusters, locations of clusters and normalization factors used during clustering. Cluster information includes centroid, radius and list indexes of runs it contains and this is being used in computing heuristic values, i.e., in making a choice which cluster to load next. Location of cluster is stored using two figures, which indicate number of bytes to skip, and number of bytes to load from the corresponding logical pattern file. Normalization factors are used to normalize duration and values of query before comparing it with clusters during search.

In accordance with an embodiment, steps 302 through 308 of the method of the present disclosure can be implemented offline and is required to be executed only once and steps 310 through 316 can be an online implementation and can be executed iteratively for each search query.

At step 310, patterns to be retrieved from the stored clusters are described in a pre-defined search query, by pattern generator 28. An event can be queried, using a logical pattern of multiple sensors. For every symbol of the pattern, duration and a value is also specified. The values of '+' and '−' symbol contain their average slopes while for '0' symbol it contains average magnitude of the symbol. These values and durations can have one of the following three types of attributes:

1. Free type: This kind of value allows retrieved variable to take any value and is represented by '*'.
2. Approximate type: This type of value is represented by a number e.g. '10'. Such value indicates that the target value should be approximately near this value.
3. Range type: This kind of value enforces a strict criterion for retrieved symbols. This can be represented in three ways, first way is to have bound on maximum of the average of symbol e.g. '<10', second way is to have bound on minimum of the average of the symbol e.g. '>10' and third way is to have bound on both minimum and maximum e.g. '8-12'. Therefore, query for an event on a single sensor, in accordance with the present disclosure can be written as: "Engine Speed: 0-0: *, 3, * :>30: 4-8:<10" wherein, *, 3, * represents durations of symbols and implies engine speed should be steady '0' for any duration of time and it should fall '−' for approximately 3 seconds, and then become steady '0' for any duration again.

Again, >30: 4-8:<10 represents information about the symbols and implies that engine speed should have average absolute value >30 and thereafter it should fall '−' with average of 4-8 followed by a steady state with average absolute value <10. In this manner, the query language of the present disclosure allows to describe very complex shapes with very high precision. Similarly, a query for multi-sensor logical patterns can be defined by specifying a valid query for every sensor.

At step 312, at least one cluster is searched and retrieved from the disk referenced in TRIE based index structure (illustrated in FIG. 2) in memory 22, if found relevant to the search query, by search engine 24. Algorithm 2 for searching for occurrences of multi-sensor logical patterns is indicated herein below.

---

Algorithm 1: Search Algorithm

---

Input: Multi-sensor Query
Output: Retrieved Instances
Initialization: Cluster container list for every sensor;
Sort clusters within trie-structure based on distance described in equation 3
(herein below) for every sensor;
Load nearest clusters for every sensor in cluster container list;
while TRUE do
    Find common time-stamps for new cluster combinations made due to loaded cluster;
    Check termination criterion, stop if required;
    Compute heuristics value for all choices of clusters to load;
    Load cluster based on heuristic value;
end

---

A second step executed by Algorithm 2 includes arranging clusters at the node corresponding to the specified logical pattern within the TRIE structure for every sensor. Clusters C are sorted by their distance from query Q as defined in equation 3 below, which is the product of approximate distance described in equation 1 for approximate type attributes and range distance described in equation 2 for range type attributes. Approximate distance measures estimate the distance between approximate distance (A) and range distance (R) measures estimate the chances of not having time-stamps within range for that cluster. In equation 1 and equation 2, Ai/Ri (approximate distance/range distance) is equal to 1 if $i^{th}$ variable in C is of approximate/range type and $Q_i/C_i$ are $i^{th}$ variable of query/cluster. M is the count of symbols present in the logical pattern for one sensor. Radius (C) represents radius of cluster C and $overlap_i$ is the fraction of cluster that lies within range for $i^{th}$ range type attribute. For example, if cluster has radius 2 and center at (2, 0) than, for dimension x-dimension i.e. $overlap_i$ will be 0.25, 0.5, 0 corresponding to >3, 1-3, <0 and for y-dimension $overlap_i$ will be 0.25, 0.5, 0.75 corresponding to >1, (−1)−(1), >−1. As clear from equation 3, the distance measure is ∞ if a cluster is out of range for any of the specified range type attribute. If the nearest cluster has distance ∞ than there is no match found to the query.

$$AD(Q, C) = \begin{cases} \dfrac{1}{\sum_{i=1}^{2 \times M} A_i} \sum_{i=1}^{2 \times M} N_i \times (Q_i - C_i)^2, & \text{if one/more approximate variable in } Q \\ 1, & \text{if no approximate variable in } Q \end{cases} \quad (1)$$

$$RD(Q, C) = \begin{cases} \dfrac{1}{\sum_{i=1}^{2 \times M} R_i} \sum_{i=1}^{2 \times M} R_i \times \dfrac{2 \times \text{radius}(C) - overlap_i}{2 \times \text{radius}(C)}, & \text{if one/more range variable in } Q \\ 1, & \text{if no range variable in } Q \\ \infty, & \text{if } C \text{ out of range for one/more variable} \end{cases} \quad (2)$$

$$dist(Q, C) = AD(Q, C) \times RD(Q, C) \quad (3)$$

Algorithm 2 can be used to find indexes of patterns with properties specified in query. Logical patterns are stored in files with clusters separated as described herein above in step 308. To find indexes, firstly relevant clusters are loaded into memory by a pre-defined heuristic approach. Given one cluster from every sensor present in the query, common indexes with properties specified in the query across multiple sensors are identified.

A first step executed by Algorithm 2 includes initializing a cluster container list for each sensor involved in the query. This will be used to load clusters of logical patterns based on the nodes in the TRIE corresponding to the logical pattern expressed for a particular sensor. Cluster container list is a two dimensional list where one dimension is used to store indexes of runs and another for indexes of time-stamps where that particular logical pattern has appeared with in that run. Both indexes of runs and time-stamps were sorted before storing them as explained in step 308 so that their intersection can be detected faster.

A third step executed by Algorithm 2 includes loading nearest clusters into memory for every sensor.

Fifth step executed by Algorithm 2 includes finding common time-stamps which satisfies properties specified by query. To do this, first the intersection in the first dimension of the cluster that is indexes of runs is detected. If any match is found, then intersection in another dimension of time-stamps is detected. While matching time-stamps, even if the initial time-stamps of logical patterns across different sensors are less than a threshold, they are considered as relevant matches. This is done to account for the difference in the response time of different sensors for a particular event and secondly this difference can exist because of symbol encoding process.

Sixth step of Algorithm 2 includes a check for termination criterion for terminating the search process.

Seventh step of Algorithm 2 includes computing heuristic values as defined in equation 4 for all relevant clusters to load. Higher heuristic values (HV) is preferred firstly for the higher probability of match and secondly for a faster hit.

$$HV(C_j) = \frac{\left[\bigcap_{i=1, i \neq j}^{K} Index_i\right] \cap [\text{List of Files}(C_j)]}{Num \text{ of files}(C_j)} \times \qquad (4)$$

$$\text{Support }(C_j) \times \frac{dist(Q, C_{j0})}{dist(Q, C_j)}$$

Eighth step of Algorithm 2 includes loading the cluster with highest heuristic value. After this step, steps 5 through 8 are repeated unless the termination criterion in the sixth step is satisfied. In new iterations at step 5 of Algorithm 2, all new combinations of clusters made due to newly loaded clusters with previously loaded clusters from rest of the sensors are considered. Although rare, there is little possibility of having all clusters returning a zero heuristic value in the initial stages of search especially when initial loaded clusters are small. In that case random cluster is chosen to load for the rest of sensors, and they are kept in the wait list and next in the cluster list for other sensors are taken up. In the next iteration, these waiting clusters are considered as a choice along with the cluster that are next in list.

Clusters which are out of range for one or more variables will come together at the end of the list. When any such cluster arrives in the list that sensor is considered to have been screened. Once clusters associated with all sensors are screened, the search is terminated. In addition to that a count on number of retrieved instances is maintained and search is terminated when number of retrieved instances is equal or greater than it was queried for, instance in the scenario wherein user queries for the 'top . . . ' results.

At step 314, the logical patterns retrieved in the at least one cluster found relevant to the search query are ranked based on degree of relevance to the search query, by ranking engine 26. Given query has been made for K sensors which contains $M_i$ number of symbols in $i^{th}$ sensor which implies total $2 \times M_i$ number of attributes for $i^{th}$ sensor. Similarity score (SS) as described in equation 5 computes similarity between retrieved instance I and query Q, where $N_{i,j}/R_{i,j}$ are one of $j^{th}$ attribute of $i^{th}$ sensor is approximate/range type of attribute or else equal to zero, $Q_{i,j}/I_{i,j}$ represent value of $j^{th}$ attribute $i^{th}$ sensor for query/retrieved instance. $Q^*_{i,j}$ is computed for range attributes which is lower/upper limit if bound is on max/min kind or average of both upper and lower limits if bound is of between type. $T_p$ is the total permitted shift that start of all time-stamps can have and $T_I$ is the maximum difference in initial time-stamps of retrieved instance I across all sensors.

$$SS(Q, I) = \left( \sum_{i=1}^{K} \sum_{j=1}^{2 \times M_i} N_{i,j} \times (Q_{i,j} - I_{i,j})^2 + R_{i,j} \times (Q_{i,j} - I_{i,j})^2 \times \frac{T_P - T_I}{T_P} \right) \qquad (5)$$

At step 316, at least one of the highest ranked logical patterns are detected and retrieved in response to the search query, by pattern retriever 30.

Figure 4A:
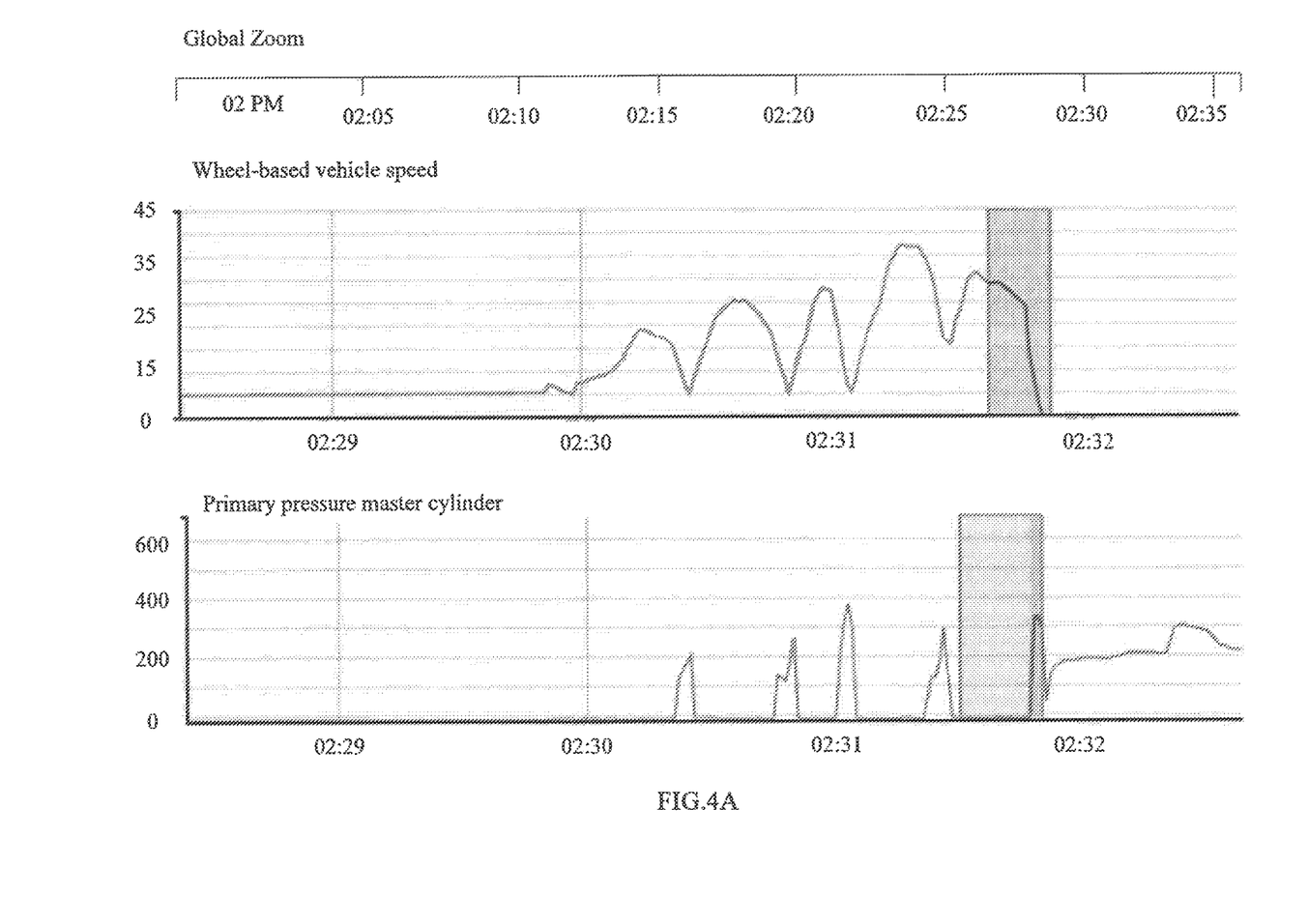
FIG. 4A is an illustration of output associated with an experimental setup with vehicle speed and primary cylinder pressure data set obtained for hard-stop condition.

FIG. 4A is an illustration of output associated with an experimental setup with vehicle speed and primary cylinder pressure data set obtained for hard-stop condition which can be defined as sudden drop in wheel-based vehicle speed and sudden increase in primary cylinder pressure. An exemplary multi-sensor query is defined as "Wheel-based Vehicle Speed: 0−: *, 3:>20:<−5 & Primary Pressure Master Cylinder: 0+: *, 3:<10, >200" which means wheel-based vehicle speed should be steady approximately at an average of 20 mph and then it should fall with the rate of 5 mph per second roughly for 3 seconds along with primary master cylinder pressure which should be steady approximately at an average of 10 psi followed by sudden rise at 200 psi per second roughly for 3 seconds. In FIG. 4A, one such retrieved instance is highlighted. It is seen that primary pressure responds earlier and for shorter duration in comparison to wheel-based vehicle speed which indicates that patterns across different sensors should be described and treated separately. Every folder and every file that has got any retrieved instances is pulled up and every file with highest rank that has occurred in that file or folder is prompted so that high ranked instances can be located faster.

Figure 4B:
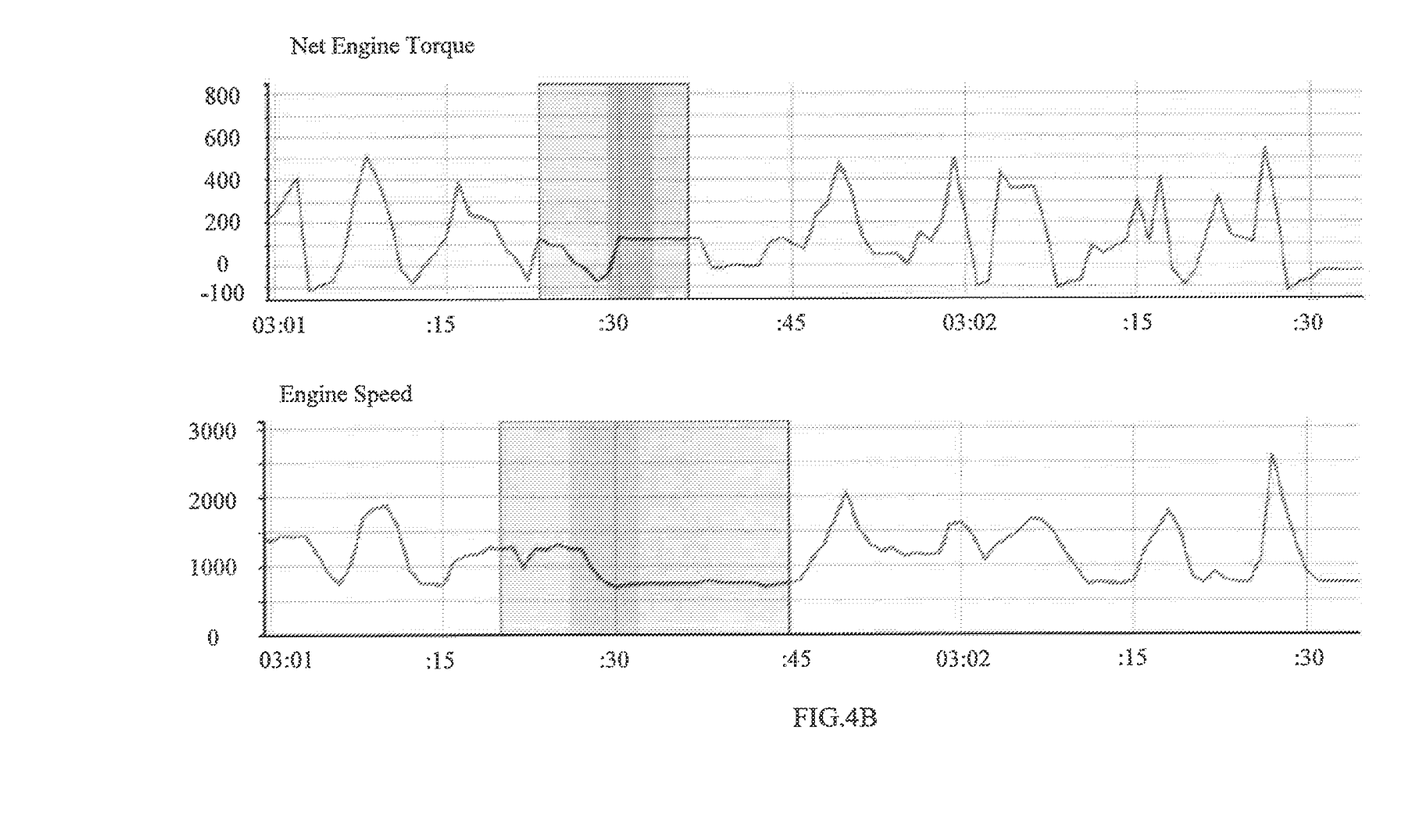
FIG. 4B is an illustration of an output associated with an experimental setup with sensor data obtained from engines for laden condition.

FIG. 4B is an illustration of an output associated with an experimental setup with sensor data obtained from engines for laden condition which can be detected by determining those intervals of time where high torque and low acceleration occur together. FIG. 4B shows that behavior of torque is similar to engine speed for most of the duration as expected. But for laden condition this behavior of sensor gets reversed. As can been seen from FIG. 4B, the highlighted segment as returned by the system of the present disclosure is that of a laden condition.

In accordance with an embodiment, before performing any processing on the time series T, smoothing of the time-series data can be performed if data is noisy. Often data collected at higher sampling rate contains lot of noise. Smoothing helps in compressing the time-series data. Smoothing may be performed by any technique known in the art including but not limited to moving average filter, as higher smoothing by moving average leads to slow changes in the slope and hence more compression in the data. This advantage however needs to be weighed against loss of information.

In accordance with an embodiment, the deviation filter threshold can be set to a low value to enable retrieval of more instances. However, this advantage needs to be weighed against increased noise generation.

In accordance with an embodiment, value of parameter $T_p$ which is total permit shift in initial time-stamps of logical patterns needs to be adjusted suitably since high value of $T_p$ may lead to increased noise.

In an embodiment, the system and method of the present disclosure can be implemented in conjunction with supervised or semi-supervised machine-learning based approaches.

In accordance with the present disclosure, the query language described herein above can describe multi-sensor events in terms of logical multi-sensor patterns. Encoding and storing time-series data as described enables efficient search for such logical patterns. Systems and methods of the present disclosure can find various applications such as building a tool for annotating events and training event classifier on vehicle sensor data or for selecting number of sub-sequences to apply such a classifier during the detection stage, as well for exploratory data analysis. Systems and methods of the present disclosure are capable of handling logical multi-sensor patterns which are of variable length and similar shape along with shift in their occurrence across different sensors.

The written description describes the subject matter herein to enable any person skilled in the art to make and use the embodiments of the disclosure. The scope of the subject matter embodiments defined here may include other modifications that occur to those skilled in the art. Such other modifications are intended to be within the scope if they have similar elements that do not differ from the literal language of the claims or if they include equivalent elements with insubstantial differences from the literal language.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the system may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules comprising the system of the present disclosure and described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device. The various modules described herein may be implemented as either software and/or hardware modules and may be stored in any type of non-transitory computer readable medium or other storage device. Some non-limiting examples of non-transitory computer-readable media include CDs, DVDs, BLU-RAY, flash memory, and hard disk drives.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Further, although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It is intended that the disclosure and examples be considered as exemplary only, with a true scope and spirit of disclosed embodiments being indicated by the following claims.

What is claimed is:

1. A method for searching and retrieving logical patterns from multi sensor time-series data comprising:
   receiving at least one time-series data from at least one sensor for searching and retrieving logical patterns, by an input module;
   pre-processing the received at least one time-series data into at least one sequence of logical symbols, by a pre-processor;
   extracting logical patterns from the at least one sequence of logical symbols, by an extractor;
   clustering and storing the extracted logical patterns in a disk and a memory, by an organizer; and
   iteratively performing:
      describing a pattern to be retrieved from the stored clusters in a pre-defined search query, by a pattern generator;
      searching and retrieving at least one cluster from the disk referenced in TRIE based index structure in the memory, if found relevant to the search query, by a search engine;
      ranking the logical patterns retrieved in the at least one duster found relevant to the search query based on degree of relevance to the search query, by a ranking engine; and
      retrieving at least one of a highest ranked logical patterns detected in response to the search query, by a pattern retriever.

2. The method for searching and retrieving logical patterns of claim 1, wherein the search query is a textual query.

3. The method for searching and retrieving logical patterns of claim 1, wherein the step of pre-processing the received at least one time-series data comprises:
   splitting of the received at least one time-series data into a plurality of non-overlapping time-series segments;
   computing slopes of each segment; sorting and grouping the sorted set of segments based on the computed slopes, each group having equal number of sample points;
   computing average slopes for each group of segments;
   annotating each sample point as increasing (+), steady (0) and decreasing (−) by comparing the slope with the corresponding computed average value of slope; and
   classifying the at least one time-series data as a sequence of logical symbols characterized by the annotated sample points, value comprising average magnitude and length of the segment.

4. The method for searching and retrieving logical patterns of claim 3, wherein the step of pre-processing the received at least one time-series data further comprises the step of refining the sequence of logical symbols by merging logical symbols having length of the segment lesser than a pre-defined threshold.

5. The method for searching and retrieving logical patterns of claim 3, wherein the value and length of the segment comprises at least one of three attributes such as free type, approximate type and range type.

6. The method for searching and retrieving logical patterns of claim 1, wherein the step of pre-processing the received at least one time-series data is preceded by the step of smoothing to eliminate noise, the step of smoothing being performed by at least one technique selected from the group consisting of moving average filter, additive smoothing, Butterworth filter, digital filter, Kalman filter, Laplacian smoothing, exponential smoothing, stretched grid method, low-pass filter, Savitzky-Golay smoothing filter, local regression, smoothing spline, Ramer-Douglas-Peucker algorithm, and Kolmogorov-Zurbenko filter.

7. The method for searching and retrieving logical patterns of claim 1, wherein the step of clustering and storing the extracted logical patterns comprises:
 pre-defining a common threshold for all sensors by performing Z-normalization;
 rejecting the extracted logical patterns having magnitude deviation smaller than the pre-defined threshold;
 representing every extracted logical pattern of fixed length of logical symbols as a vector;
 clustering like vectors according to time-stamp, duration and values of associated logical symbols along with either the associated index or index of the next symbol in the logical pattern;
 storing the clusters on a disk as database summary; and
 storing metadata of the clusters in a memory in a TRIE-based structure.

8. The method for searching and retrieving logical patterns of claim 1, wherein the step of describing a pattern to be retrieved from the stored clusters in a pre-defined search query comprises defining at least one attribute associated with the value and length of the segment for each logical symbol.

9. The method for searching and retrieving logical patterns of claim 1, wherein the step of searching and retrieving at least one cluster comprises:
 initializing a cluster container list for each sensor involved in the search query, the cluster container list comprising a first dimension for storing indexes of runs and a second dimension for storing indexes of time-stamps where the logical pattern has appeared within that run;
 sorting dusters within the TRIE-based structure for each sensor based on their distance from the search query;
 loading nearest clusters into the duster container list for each sensor;
 iteratively performing:
  identifying common time stamps which satisfy properties specified by the search query;
  computing heuristics value for all choices of clusters to load;
  loading the cluster with highest heuristic value; and
 terminating the search when a pre-defined termination criterion is met.

10. The method for searching and retrieving logical patterns of claim 9, wherein the step identifying common time stamps comprises finding an intersection of occurrences of logical patterns across the at least one sensor for common time stamps by:
 detecting intersection in the first dimension of the cluster container list; and
 detecting intersection in the second dimension of the cluster container list, in the event that there is a match for intersection in the first dimension.

11. A system for searching and retrieving logical patterns from multi sensor time-series data comprising:
 one or more processors;
 a communication interface device;
 one or more internal data storage devices operatively coupled to the one or more processors for storing:
  an input module configured to receive at least one time-series data from at least one sensor for searching and retrieving logical patterns;
  a pre-processor configured to pre-process the received at least one time-series data into at least one sequence of logical symbols;
  an extractor configured to extract logical patterns from the at least one sequence of logical symbols;
  an organizer configured to cluster and store the extracted logical patterns in a disk and a memory;
  a pattern generator configured to describe a pattern to be retrieved from the stored clusters in a pre-defined search query;
  a search engine configured to search and retrieve at least one cluster from the disk referenced in TRIE based index structure in the memory, if found relevant to the search query;
  a ranking engine configured to rank the logical patterns retrieved in the at least one cluster found relevant to the search query based on degree of relevance to the search query; and
  a pattern retriever configured to retrieve at least one of a highest ranked logical patterns detected in response to the search query.

12. A computer program product comprising a non-transitory computer readable having a computer readable program embodied therein, wherein the computer readable program, when executed on a computing device, causes the computing device to:
 receive at least one time-series data from at least one sensor for searching and retrieving logical patterns, by an input module;
 pre-process the received at least one time-series data into at least one sequence of logical symbols, by a pre-processor;
 extract logical patterns from the at least one sequence of logical symbols, by an extractor;
 cluster and store the extracted logical patterns in a disk and a memory, by an organizer;
 describe a pattern to be retrieved from the stored clusters in a pre-defined search query, by a pattern generator;
 search and retrieve at least one cluster from the disk referenced in TRIE based index structure in the memory, if found relevant to the search query, by a search engine;
 rank the logical patterns retrieved in the at least one cluster found relevant to the search query based on degree of relevance to the search query, by a ranking engine; and
 retrieve at least one of a highest ranked logical patterns detected in response to the search query, by a pattern retriever.

* * * * *